United States Patent

Hendriks van de Weem et al.

(10) Patent No.: US 6,658,826 B2
(45) Date of Patent: Dec. 9, 2003

(54) ASSEMBLY FOR PACKAGING A DISCONTINUOUSLY SUPPLIED STREAM OF PRODUCTS

(75) Inventors: Johannes Gerardus M. Hendriks van de Weem, Westzaan (NL); Ronald Timmerman, Zaandam (NL)

(73) Assignee: Buhrs-Zaandam B.V., Zaandam (NL)

( * ) Notice: Subject to any disclaimer, the term of this patent is extended or adjusted under 35 U.S.C. 154(b) by 0 days.

(21) Appl. No.: 09/898,025

(22) Filed: Jul. 5, 2001

(65) Prior Publication Data

US 2002/0026769 A1 Mar. 7, 2002

(30) Foreign Application Priority Data

Jul. 5, 2000 (NL) .............................................. 1015613

(51) Int. Cl.[7] ................................................. B65B 9/06
(52) U.S. Cl. ...................................... 53/550; 198/461.1
(58) Field of Search ........................ 53/550; 198/461.1, 198/461.2, 460.1

(56) References Cited

U.S. PATENT DOCUMENTS

| | | | |
|---|---|---|---|
| 4,537,016 A | * 8/1985 | Shanklin et al. | 53/550 |
| 4,872,302 A | * 10/1989 | van Eijsden et al. | 53/550 |
| 5,285,887 A | * 2/1994 | Hall | 198/460.1 |
| 5,730,274 A | * 3/1998 | Loomer | 198/460.1 |
| 6,050,057 A | * 4/2000 | Tuyn et al. | 53/550 |

FOREIGN PATENT DOCUMENTS

| | | |
|---|---|---|
| DE | 37 38 587 | 11/1987 |
| EP | 0 686 555 A1 | 12/1995 |
| EP | 0 712 782 A1 | 5/1996 |
| EP | 0 875 455 A1 | 4/1998 |
| EP | 0 685 417 B1 | 8/1998 |
| EP | 0 689 994 B1 | 1/1999 |
| NL | 1004696 | 8/1998 |
| WO | WO 99/44925 | 9/1999 |

* cited by examiner

*Primary Examiner*—Ted Kavanaugh
(74) *Attorney, Agent, or Firm*—Birch, Stewart, Kolasch & Birch, LLP

(57) ABSTRACT

An assembly for packaging a discontinuously supplied stream of products, comprising a packaging apparatus provided with folding means for folding the longitudinal edges of the continuous packaging web around the products in longitudinal direction to form a tubular packaging sleeve, connecting means and separating means for breaking the tubular packaging sleeve between the products in a transverse direction for forming separated packaged products, wherein the assembly comprises a conveyor chain which is provided with grippers for clamping therein the products to be conveyed, the assembly further comprising an intermediate conveyor built up from a number of mutually aligning conveying sections drivable independently of each other and with variable speed, the intermediate conveyor being provided with a control adapted to drive the various conveying sections of the intermediate conveyor such that the mutual distances between discontinuously supplied products are reduced to a standard distance.

3 Claims, 2 Drawing Sheets

ASSEMBLY FOR PACKAGING A DISCONTINUOUSLY SUPPLIED STREAM OF PRODUCTS

BACKGROUND OF THE INVENTION

1. Field of the Invention

This invention relates to an assembly for packaging a discontinuously supplied stream of products, comprising a packaging apparatus provided with a carrier for rotatably supporting a roll containing a continuous packaging web, means for placing products to be packaged on the continuous packaging web, folding means for folding the longitudinal edges of the continuous packaging web around the products in longitudinal direction to form a tubular packaging sleeve, connecting means for forming in each case at least one transverse connection in the tubular packaging sleeve between two successive products, and separating means for breaking the tubular packaging sleeve in a transverse direction between the products for forming separated packaged products.

2. Description of Related Art

For packaging, for instance, newspapers, magazines or like documents in film or paper, use can be made of packaging machines as marketed by applicant. When being fed into the packaging apparatus, the products are first positioned on the continuous packaging web by means for placing products to be packaged. To that end, see applicant's earlier patent application EP-A-0 685 417, whose subject matter is to be considered inserted herein Thereafter, by means of folding means, the longitudinal edges of the continuous web of film or paper are folded in a continuous manner around the products to be packaged. For a further elaboration of possible folding means, reference is made to applicant's earlier patent application EP-A-0 686 555, whose subject matter is to be considered inserted herein. Thereafter, the continuous film or paper web with the longitudinal edges folded over, is cut through between the products and optionally sealed. To that end, see, for instance, applicant's earlier patent application EP-A-0 689 994, whose subject matter is to be considered inserted herein. If too long an interruption in the supply of the products occurs, folding over the longitudinal edges may present problems as the longitudinal edges are not folded around anything: the products are lacking. When the interruption in the product stream is only one to four products long, most packaging machines of the above-mentioned type can still continue to function properly. However, when longer interruptions in the product stream occur, it is inevitable that failures occur in the packaging machine. Such a failure leads to a halt of the entire process upstream and the entire process downstream of the packaging machine. The upstream process can comprise, for instance, a printing process for newspapers. The downstream process can be formed, for instance, by a stacking/bundling process for bundling the packaged newspapers.

The most obvious solution to the above-described problems would naturally be to stack the products that are being supplied in the discontinuous product stream. After stacking, the products could successively be pulled from the stack to create a continuous product stream suitable for processing in the packaging machine. Such a stacking/unstacking assembly might perhaps be a remedy in the case of single products, such as, for instance, magazines. In the case of multilayer products, such as, for instance, a newspaper composed of a number of loose sections, such a solution is not possible, at least not in a simple manner, taking into account that the assembly according to the invention should be capable of processing at least about 20,000 products per hour. In itself, stacking and unstacking products at a rate of 20,000 to 40,000 items per hour is already a major problem, let alone stacking and unstacking multilayer products at such a rate. Accordingly, applicant has already described a solution to this problem in international patent application WO99/44925.

SUMMARY OF THE INVENTION

The object of the invention is to provide an alternative solution to the above-described problems.

To that end, the assembly of the type described in the preamble is characterized, according to the invention, in that the assembly comprises a feeding conveyor operatively supplying a discontinuous product stream, the assembly further comprising an intermediate conveyor for supporting and conveying products, the intermediate conveyor being built up from a number of mutually aligning conveying sections, the feeding conveyor being disposed with respect to the intermediate conveyor such that the delivery of the products by the feed conveyor occurs on an in-feed end of the intermediate conveyor, while the conveying sections of the intermediate conveyor are drivable independently of each other, and a discharge end of the intermediate conveyor links up with the means for placing products to be packaged on the continuous packaging web, the assembly, or at least the intermediate conveyor, being provided with a control adapted to drive the various conveying sections of the intermediate conveyor such that the mutual distances between discontinuously supplied products are reduced to a standard distance.

With such an assembly, a discontinuous stream can be condensed to a continuous stream of products which can be processed by the packaging apparatus without any problems.

By the assembly according to the invention, a discontinuous product stream of a capacity of about 20,000 to 40,000 products per hour can be processed and even be condensed to a continuous product stream. Such a capacity can even be achieved with products built up from several layers, such as, for instance, newspapers including a number of sections loosely overlying each other. A conveyor comprising several conveying sections each drivable independently of each other is described, for instance, in Dutch patent application NL-A-1004696. The subject matter of that patent application is to be considered inserted herein.

According to a further elaboration of the invention, the feeding conveyor can comprise a conveyor chain which is provided with grippers for clamping therein the products to be conveyed, the conveyor chain extending partly above an in-feed end of the intermediate conveyor, while the grippers are arranged for releasing the products above the in-feed end of the intermediate conveyor.

BRIEF DESCRIPTION OF THE DRAWINGS

The invention will be further elucidated hereinafter on the basis of an exemplary embodiment, with reference to the drawing, wherein.

DETAILED DESCRIPTION OF THE PREFERRED EMBODIMENTS

Figure 1:
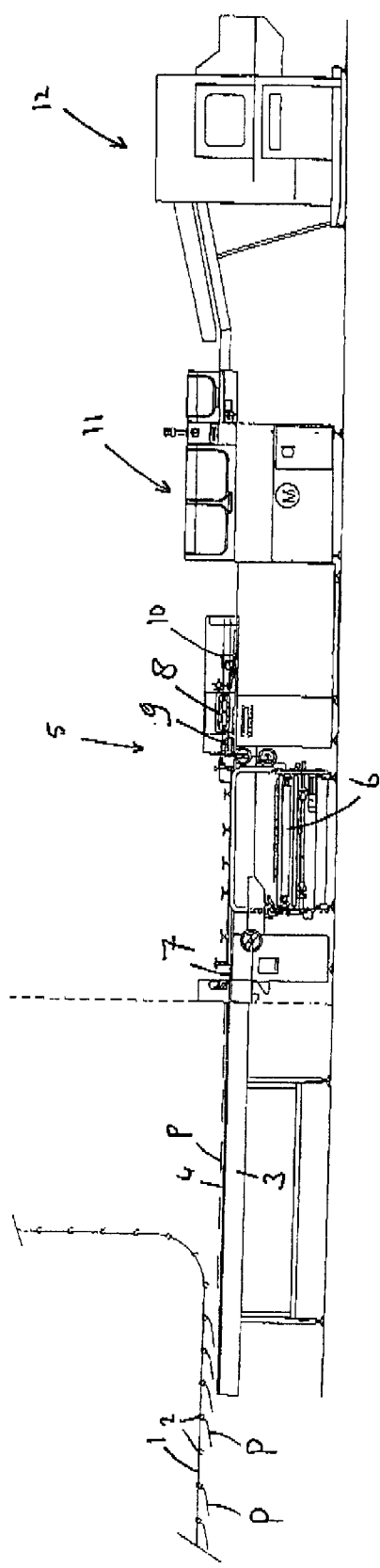
FIG. 1 shows a side elevation of the assembly.
Figure 2:
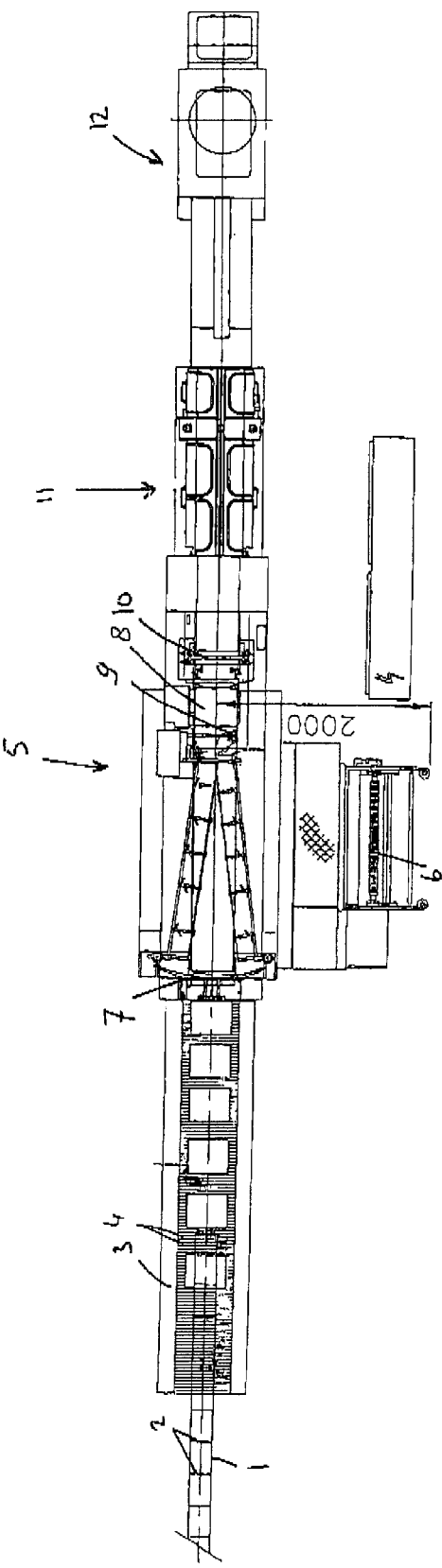
FIG. 2 shows a top plan view of the assembly.

The exemplary embodiment shown of the assembly according to the invention shows a conveyor chain 1 with grippers 2 in which products P are disposed. Such a conveyor chain is known per se and is used, for instance, in printing machines for newspapers. The assembly further comprises an intermediate conveyor 3, which is provided with conveyor rollers 4. The conveyor rollers 4 are drivable independently of each other and the rotational speed of each conveyor roller can be varied. For an exhaustive description of the intermediate conveyor 3, reference is made to Dutch patent 1004696, mentioned earlier, which is to be considered inserted herein. Downstream of the intermediate conveyor 3 there is a packaging apparatus 5. The packaging apparatus 5 is provided with a roll carrier 6 for rotatably supporting a roll comprising a continuous packaging web. The packaging web can be manufactured from paper or plastic film. The packaging web is wound off and continuously supplied to the packaging apparatus 5. The web is guided over a folding roller or over a folding block 7 as described in EP-A-0 686 555. The longitudinal edges of the packaging web are moved towards each other until they overlie each other. To that end, a pulling belt 8 is present, which pulls the longitudinal edges towards each other, for instance in the manner as described in EP-A-0 875 455, whose contents are to be considered inserted herein. Directly upstream of the pulling belt 8 is a longitudinal sealing device 9 for joining together the longitudinal edges by means of a sealing operation. When the packaging web is manufactured from paper, instead of the longitudinal sealing device, an adhesive application device may be provided, which applies adhesive to one of the longitudinal edges. After formation of the tubular packaging sleeve, with the aid of the separating means 10, the tubular packaging sleeve is separated at a point between the products P accommodated therein, yielding loose packages. When the packaging web is manufactured from film, the separating means 10 can comprise a sealing beam assembly, as described in EP-A-0 689 994. In that case, such a sealing beam assembly at the same time constitutes the connecting means for forming at least one transverse connection. In packaging products in paper, for separation, use will be made of a knife extending in a direction transverse to the paper web. Upstream of the folding section, adhesive must then be provided in transverse direction on the paper web. The connecting means can then be designed as a press-on wheel or press-on beams which, prior to or during the separation, press the tubular packaging sleeve halves onto each other. Downstream of the packaging apparatus 5, an ejection station 11 is arranged, in which products P can be ejected which have not been properly packed or are not suitable for further processing for any other reason. Such an ejection station 11 is provided, for instance, with a conveyor with a switch, which switch in a first position passes the products and in a second position ejects the products downwards. Downstream of the ejection station 11, a stacking station 12 is arranged which stacks the loosely supplied, packaged products. Such packaging stations are commercially available, so that a further discussion thereof is not necessary.

The grippers 2 of the conveyor chain 1 are arranged for delivering products P above the in-feed end of the intermediate conveyor 3. As appears clearly from FIG. 1, not all grippers 2 of the conveyor chain 1 carry a product P, so that upon delivery above the intermediate conveyor 3 there will be intervals between the products P. The rotational speed of the conveyor rollers 4 of the intermediate conveyor 3 which can be driven independently of each other is varied by a control, such that the mutual distances between discontinuously supplied products P are reduced to a standard distance. This standard distance is preferably as small as possible, so that as little packaging material as possible is used for packaging the products P. Naturally, some interspace is necessary to enable the provision of the transverse connection in-between the successive products P.

In order to reduce slip between the conveyor rollers 4 and the products P as far as possible, all conveyor rollers 4 disposed under a particular product P have substantially the same peripheral velocity. It will be clear that the speed of travel of the respective product P in that case substantially corresponds to the peripheral velocity mentioned. It will further be clear that for the purpose of moving different products P disposed on the intermediate conveyor 3 towards each other, these products will have mutually different speeds of travel. The conveyors rollers 4 of the intermediate conveyor 3 therefore can have different peripheral velocities.

The invention is not limited to the exemplary embodiment described. Thus, instead of using conveyor rollers 4, use can be made of successive conveyor belt sections whose speed of travel can be varied independently of each other. Also, not every roller 4 needs to have its own variable speed drive, but rollers located groupwise next to each other within a group can be driven by a single variable speed drive, so that the rollers within one group in each case have the same speed.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An assembly for packaging a discontinuously supplied stream of newspapers, comprising:
   a packaging apparatus provided with a roll mount for rotatably supporting a roll comprising:
      a continuous packaging web;
      means for placing newspapers to be packaged on the continuous packaging web;
      folding means for folding the longitudinal edges of the continuous packaging web around the newspapers in longitudinal direction to form a tubular packaging sleeve;
      connecting means for forming at least one transverse connection in the tubular packaging sleeve between two successive of the newspapers; and
      separating means for breaking the tubular packaging sleeve between the newspapers in a transverse direction for forming separated packaged products;
   a feeding conveyor operatively supplying a discontinuous stream of the newspapers, said feeding conveyor including a conveyor chain provided with grippers for clamping therein the newspapers to be conveyed;
   an intermediate conveyor for supporting and conveying the newspapers, the intermediate conveyor being built up from a number of mutually aligning conveying sections, the conveying sections being drivable independently of each other and with variable speed, a discharge end of the intermediate conveyor being linked up with the means for placing newspapers to be packaged on the continuous packaging web; and
   a control, said control being adapted to drive the conveying sections of the intermediate conveyor such that the mutual distances between discontinuously supplied newspapers are reduced to a standard distance,
   wherein the conveyor chain extends partly above an in-feed end of the intermediate conveyor, the grippers are arranged for releasing the newspapers above the in-feed end of the intermediate conveyor, and the conveyor chain forms part of a printing machine for newspapers.

2. The assembly according to claim 1, wherein each conveying section comprises a conveyor roller with a variable speed drive.

3. The assembly according to claim 2, wherein the conveyor rollers located under a particular product all have the same peripheral velocity, so that no slip, or hardly any slip, arises between the conveyor rollers and the respective newspapers.

* * * * *